(12) United States Patent
Katayama et al.

(10) Patent No.: US 7,628,448 B2
(45) Date of Patent: Dec. 8, 2009

(54) DRAIN STRUCTURE OF ROOF PANEL

(75) Inventors: Hajime Katayama, Sakura (JP);
Shigehito Horiuchi, Sakura (JP);
Kuniyasu Aoki, Sakura (JP); Masayuki Watarai, Wako (JP); Toshiaki Kuroi, Wako (JP)

(73) Assignees: Honda Motor Co., Ltd., Tokyo (JP);
Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 12/043,457

(22) Filed: Mar. 6, 2008

(65) Prior Publication Data
US 2008/0217964 A1 Sep. 11, 2008

(30) Foreign Application Priority Data
Mar. 8, 2007 (JP) .............................. 2007-058670

(51) Int. Cl.
*B60J 7/00* (2006.01)
(52) U.S. Cl. .................................. 296/213; 296/216.09

(58) Field of Classification Search ................. 296/213, 296/216.06, 216.09, 217; 49/476.1
See application file for complete search history.

(56) References Cited

U.S. PATENT DOCUMENTS

| 5,507,123 A * | 4/1996 | Holt ............................... 52/97 |
| 6,523,889 B2 * | 2/2003 | Birndorfer et al. .......... 296/217 |
| 6,893,084 B2 * | 5/2005 | Tamura et al. ......... 296/216.09 |
| 7,360,826 B2 * | 4/2008 | Nakagawa et al. ..... 296/216.09 |
| 2008/0141602 A1 * | 6/2008 | Allen ....................... 52/302.1 |

FOREIGN PATENT DOCUMENTS

JP   2003-211967   7/2003

* cited by examiner

*Primary Examiner*—Dennis H Pedder
(74) *Attorney, Agent, or Firm*—Rankin, Hill & Clark LLP

(57) ABSTRACT

A roof panel attached to a roof of a vehicle so that the roof panel can be tilted up, and a wind lip provided in peripheral edge portion of the lower surface of the roof panel. The wind lip projects toward the inside of the vehicle. Further, a drain groove extending in up-and-down direction is formed on an outer surface of the wind lip.

5 Claims, 4 Drawing Sheets

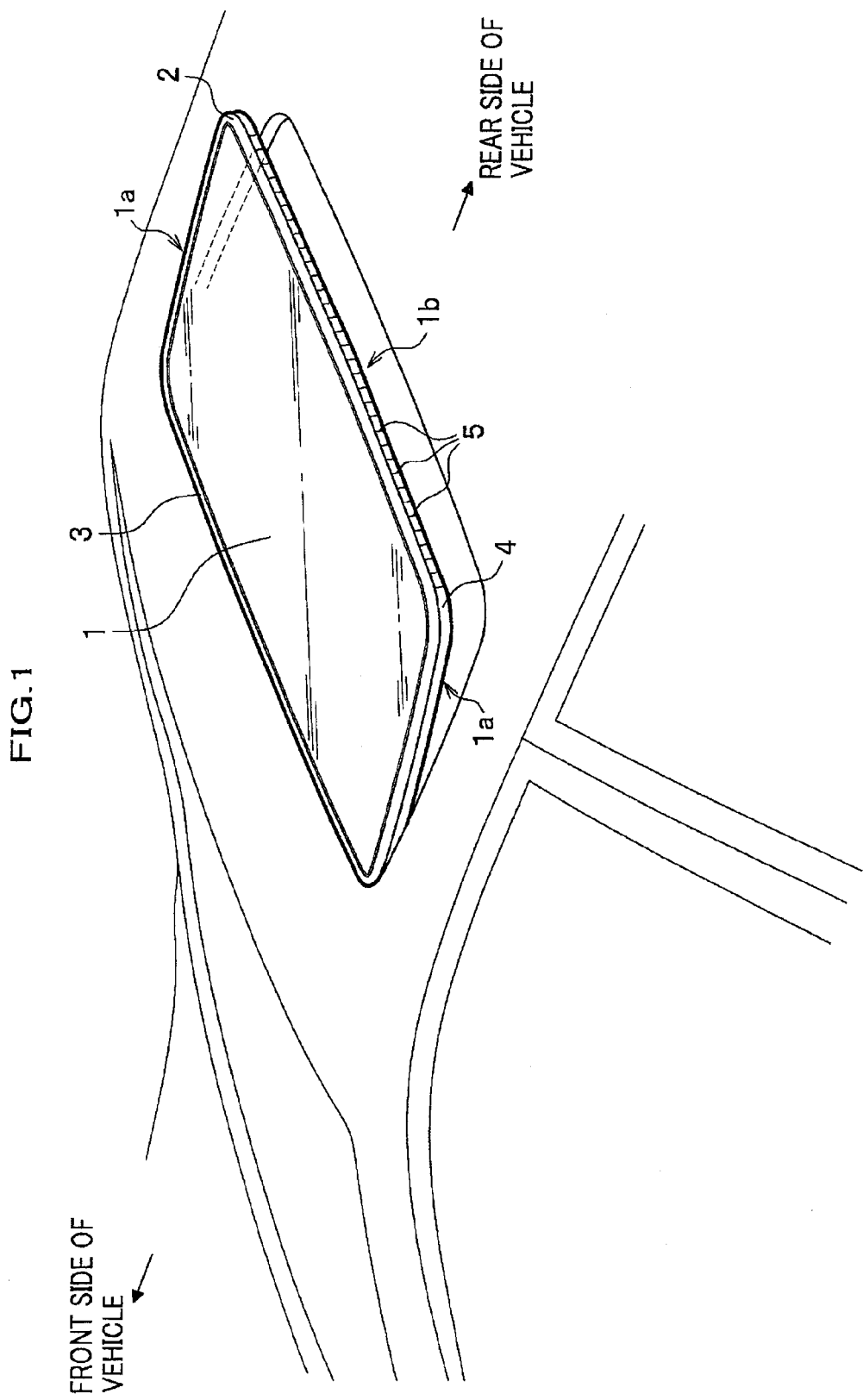

FRONT SIDE OF VEHICLE

REAR SIDE OF VEHICLE

DRAIN STRUCTURE OF ROOF PANEL

CROSS-REFERENCE TO RELATED APPLICATION(S)

This application claims the foreign priority benefit under Title 35, United States Code, §119 (a)-(d), of Japanese Patent Application No. 2007-058670 filed on Mar. 8, 2007 in the Japan Patent Office, the disclosure of which is herein incorporated by reference in its entirety.

BACKGROUND OF THE INVENTION

1. Field of the Invention

The present invention relates to a drain structure of a roof panel of a vehicle sunroof device.

2. Description of the Related Art

FIG. 6 is a cross section showing the structure around a rear edge portion of a tilt-up type roof panel of a conventional vehicle sunroof device. A seal member (a weather strip) 32 is attached to a peripheral edge portion of a roof panel 31 through a seal member fixing frame 33. A wind lip 34 projecting toward the inside of the vehicle is integrated with the seal member fixing frame 33. When tilting up the roof panel 31 during traveling, since the air sucked from the inside to the outside of the vehicle is rectified by the wind lip 34, unpleasant noise caused by the sucked air is reduced. The aforesaid configuration is disclosed in Japanese Patent Laid-Open Publication No. 2003-211967.

When tilting up the roof panel 31 after washing the vehicle, after the rain, or at light rain, since the water drops adhered on the roof panel 31 and the seal member 32 may enter inside the vehicle through the outer surface of the wind lip 34 (i.e., through the surface of the wind lip 34 facing the rear side of the vehicle), a drain channel 35 is provided below the wind lip 34 to receive the water drops. In such a case it is preferred that the water drops adhered on the outer surface 34a of the wind lip 34 reliably flow toward a lower end of the wind lip 34 and drop into the drain channel 35 without flowing toward the lateral direction (vehicle width direction).

SUMMARY OF THE INVENTION

An object of the present invention is to provide a drain structure of a roof panel whose wind lip has excellent drainage property.

A drain structure of a roof panel according to a first aspect of the present invention includes: a roof panel attached to a roof of a vehicle so that the roof panel can be tilted up; and a wind lip provided in a peripheral edge portion of a lower surface of the roof panel, the wind lip projecting toward the inside of the vehicle, in which a drain groove extending in up-and-down direction is formed on an outer surface of the wind lip.

With such a configuration, since water drops coming from the outside and adhered on the outer surface of the wind lip is guided by the drain groove so as to efficiently flow toward a lower end of the wind lip, excellent drainage property can be obtained.

In the aforesaid drain structure of the roof panel, it is preferred that a plurality of recesses are formed on a lower end of the wind lip, the recesses being formed along the vehicle width direction at a predetermined interval.

When the roof panel is tilted up during traveling, noise is caused by the air sucked from the inside to the outside of the vehicle. However, with the aforesaid configuration, since a turbulence in the air stream passing beneath the wind lip is generated, the large pressure difference between inside and outside of the vehicle is reduced, and therefore the unpleasant noise caused by the sucked air can be reduced.

In the aforesaid drain structure of the roof panel, it is preferred that both sides of each corner portion of the recesses are respectively provided with a drain groove.

Since the sucked air stagnates around the corner portion of the recess, the water drops are apt to gather at the corner portion of the recess, and therefore the water drops gathering at the corner portion tend to flow toward the inner surface side of the wind lip through the corner portion. Thus, by providing a drain groove to both sides of each corner portion of the recesses, the water drops gathering at the corner portion are prevented from flowing toward the inner surface side of the wind lip through the corner portion.

In the aforesaid drain structure of the roof panel, it is preferred that the drain groove is formed on a seal member fixing frame attached to an edge portion of the roof panel.

With such a configuration, since the seal member fixing frame is used to form the drain groove, the cost of the roof panel can be reduced.

BRIEF DESCRIPTION OF THE DRAWINGS

FIG. 1 is a partial perspective view showing the appearance of a roof panel of an embodiment of the present invention, the roof panel being in a tilt-up state;

FIGS. 2A to 2C show the structure around a peripheral edge portion of the roof panel, in which FIG. 2A is a partial perspective view of the roof panel, and FIGS. 2B and 2C are cross sections respectively taken along line A-A and line B-B of FIG. 2A;

DETAILED DESCRIPTION OF PREFERRED EMBODIMENT(S)

Figure 2A:
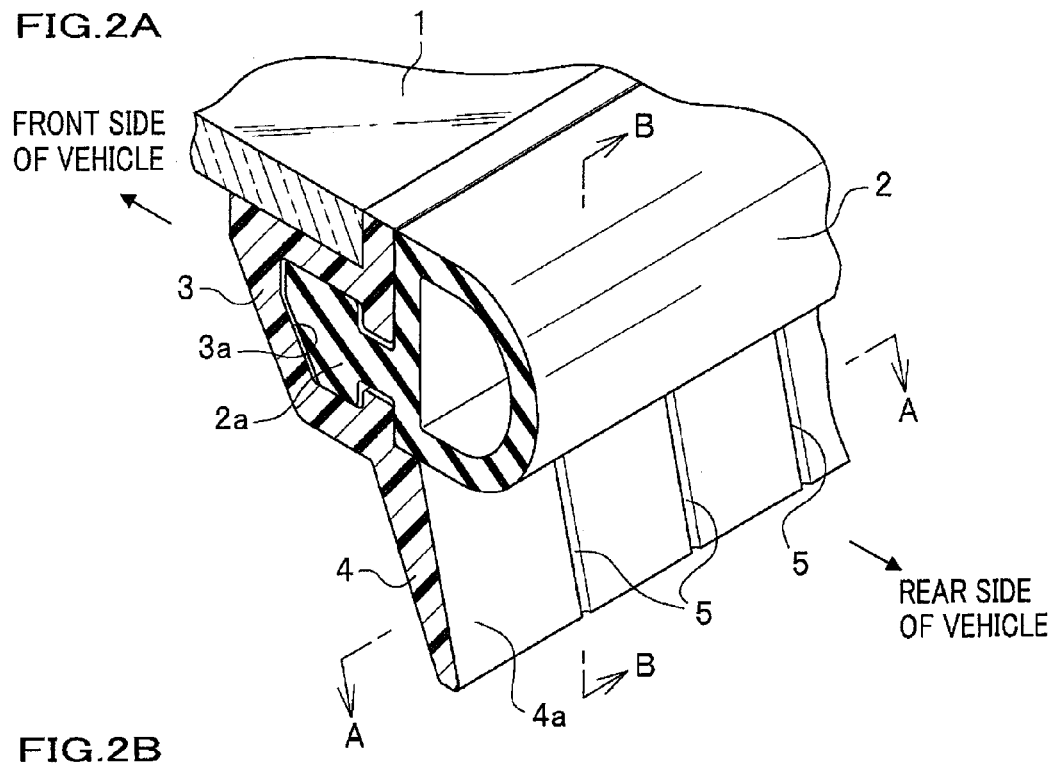
Figure 2B:
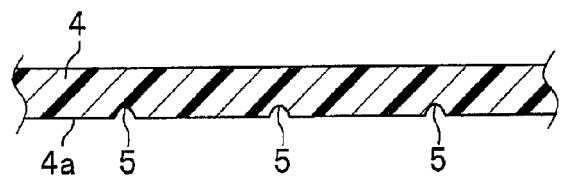
Figure 2C:
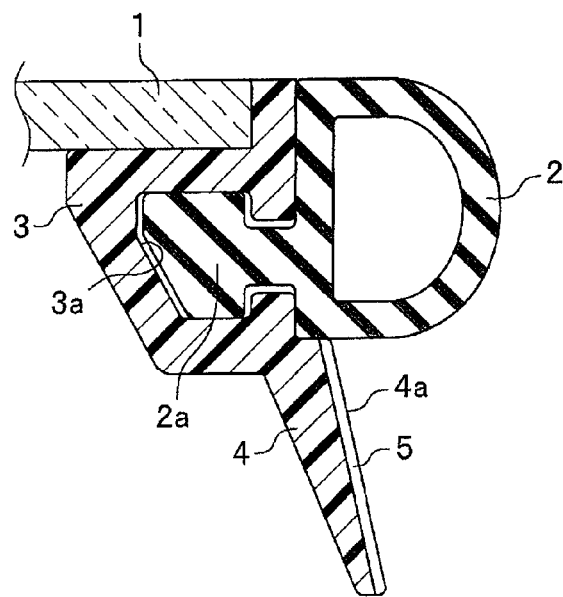

FIG. 1 is a partial perspective view showing the appearance of a roof panel 1 in a tilt-up state of an embodiment of the present invention, and FIGS. 2A to 2C show the structure around a peripheral edge portion of the roof panel 1, in which FIG. 2A is a partial perspective view of the roof panel 1, and FIGS. 2B and 2C are cross sections respectively taken along line A-A and line B-B of FIG. 2A.

A seal member (a weather strip) 2 is attached to the peripheral edge portion of a roof panel through a seal member fixing frame 3. The seal member fixing frame 3 is made of, for example, resin and is integrated with the roof panel 1 by outsert-molding. As shown in FIGS. 2A to 2C, the seal member 2 is attached to the seal member fixing frame 3 by engaging an engaging portion 2a with an engaging groove 3a. A wind lip 4 projecting toward the inside of the vehicle is provided in a peripheral edge portion of the lower surface of the roof panel 1. Specifically, the wind lip 4 is provided in a pair of side edge portions 1a and a rear edge portion 1b of the roof panel 1 as shown in FIG. 1). In the present embodiment, the wind lip 4 is integrated with the seal member fixing frame 3. When the roof panel 1 is tilted up during traveling, the wind lip 4 rectifies the air sucked from the inside to the outside of the vehicle, so that the unpleasant noise caused by the sucked air can be reduced. Incidentally, the wind lip 4 also can be formed on the seal member 2.

The main feature of the present invention is that the drain grooves 5 extending in up-and-down direction are formed on the outer surface 4a of the wind lip 4. According to the present invention, the drain grooves 5 can either be formed over the substantially whole side edge portions 1a and substantially whole rear edge portion 1b, or be partly formed on the rear edge portion 1b only, for example, as shown in FIG. 1.

The interval of the drain grooves 5 in the lateral direction is within a range of, for example, from several cm to ten-odd cm. Incidentally, the drain grooves 5 does not have to be arranged at a constant interval, but can be properly arranged as long as the interval is within the aforesaid range. As for the section size of the drain groove 5, it is preferred that both the width and depth are within a range of, for example, from hundreds μm to several mm. The slip may have a shape of a semicircular groove, a rectangular groove, a V-shaped groove or the like. FIG. 2B shows an example in which the drain groove 5 has a shape of the semicircular groove whose width and depth are respectively about 1 mm and 0.5 mm. The drain groove 5 is formed in the up-and-down direction in a range from the vicinity of the upper end at the root to the lower end of the wind lip 4.

Figure 6:
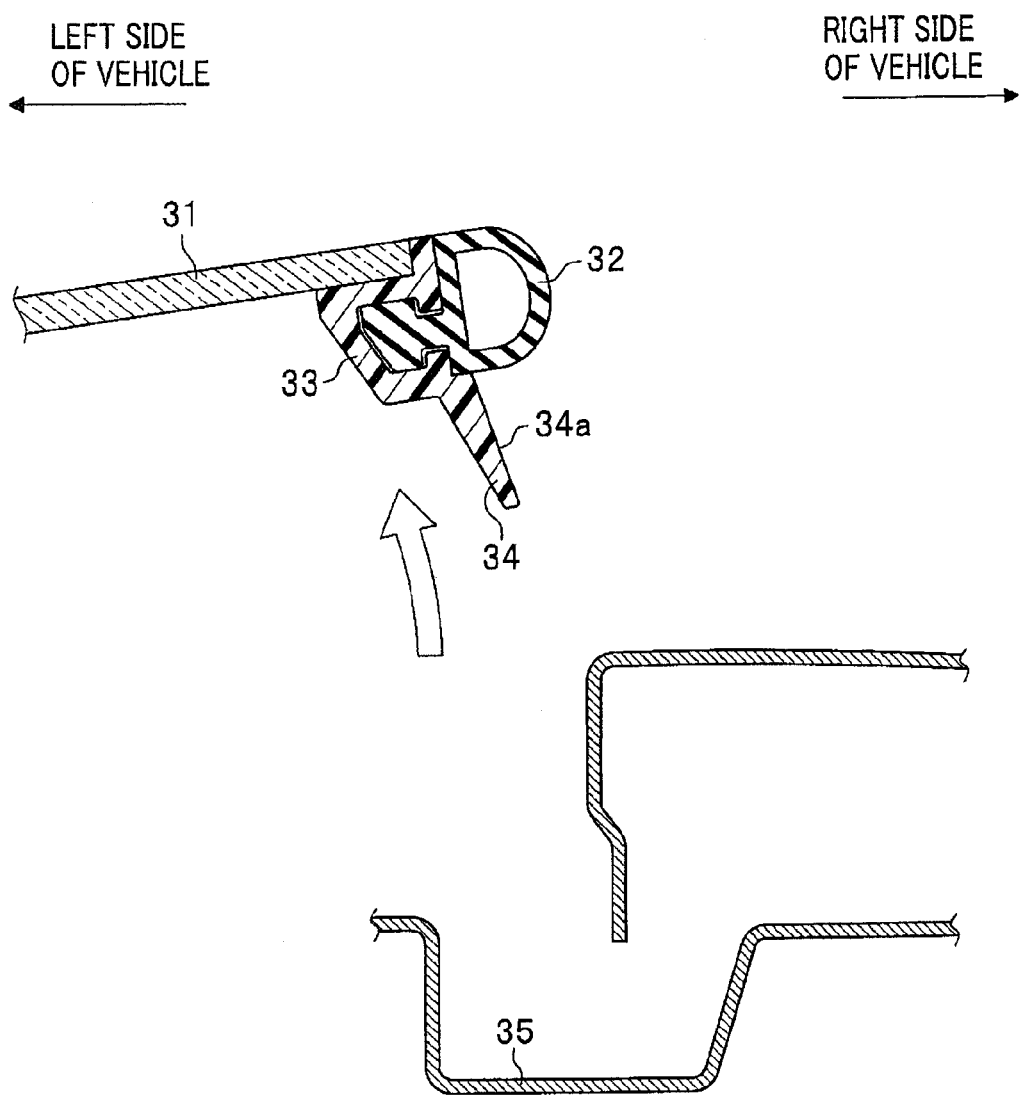
FIG. 6 is a cross section showing the structure around a rear edge portion of a conventional tilt-up type roof panel.

As described above, by arranging the drain grooves 5 on the outer surface 4a of the wind lip 4 of the roof panel 1, since the water drops coming from the outside and adhered on the outer surface 4a are guided by the drain groove 5 so as to efficiently flow toward the lower end of the wind lip 4, excellent drainage property can be obtained. The water drops dropped from the lower end of the wind lip 4 are then received by a drain channel provided on the vehicle body side (for example, the drain channel 35 shown in FIG. 6).

Figure 3:
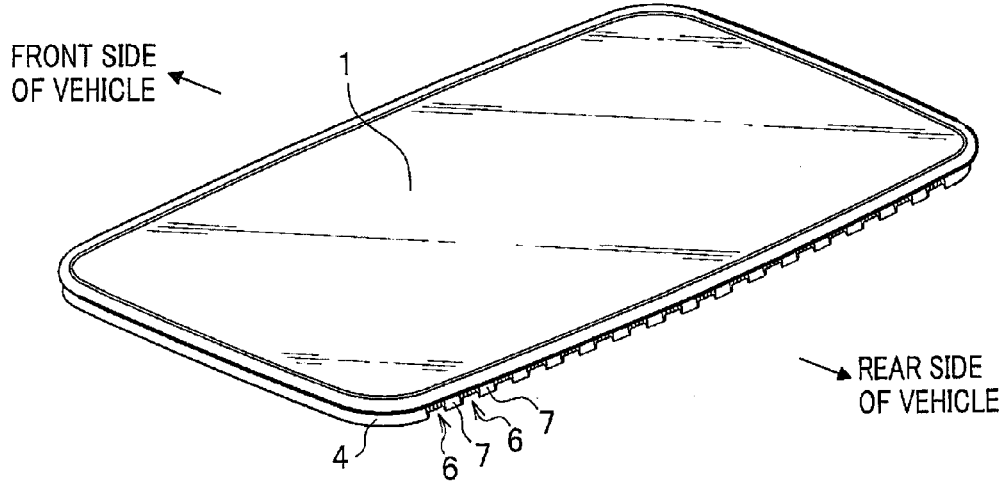
FIG. 3 is a perspective view showing the appearance of the roof panel in the case where a plurality of recesses are formed on the lower end of the wind lip of the rear edge portion of the roof panel, the recesses being formed along the vehicle width direction at a predetermined interval.
Figure 4:
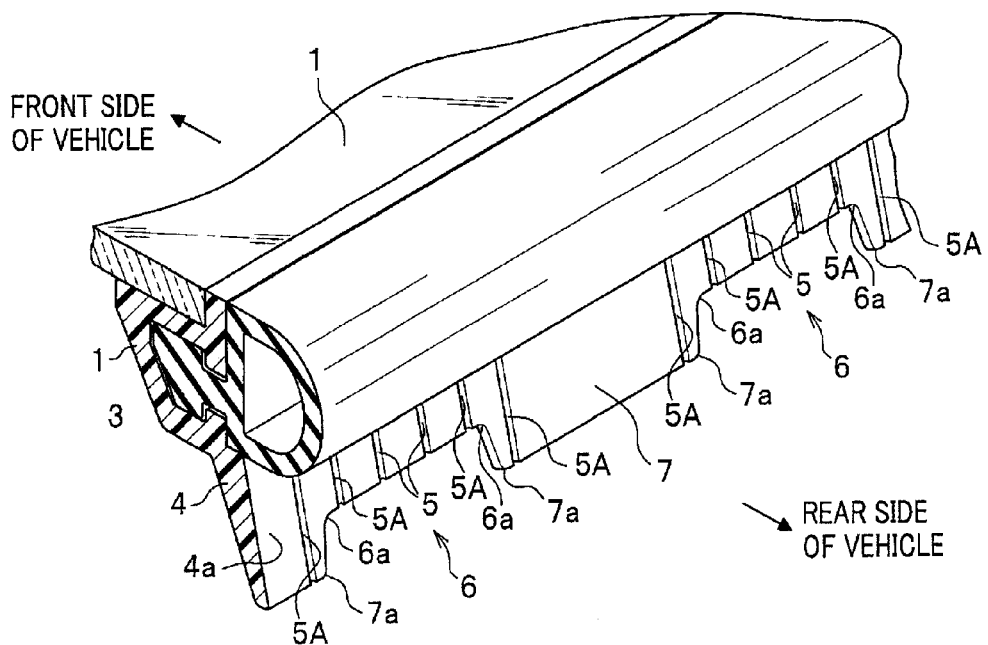
FIG. 4 is an enlarged partial perspective view of FIG. 3.

FIG. 3 is a perspective view showing the appearance of the roof panel 1 in the case where a plurality of recesses 6 are formed on the lower end of the wind lip 4 of the rear edge portion 1b of the roof panel 1, the recesses 6 being formed along the vehicle width direction at a predetermined interval. FIG. 4 is an enlarged partial perspective view of FIG. 3. In other words, the recesses 6 and projections 7 are alternately formed on the lower end of the wind lip 4. The inventor of the present invention has confirmed that, when the roof panel 1 is tilted up during traveling, turbulence in the air sucked from the inside to the outside of the vehicle is generated owing to the recesses and projections of the lower end of the wind lip 4, so that the unpleasant noise caused by the sucked air is further reduced. Dimensions of both the recess 6 and the projection 7 are, for example, about several cm in width and about 1 cm in depth.

However, in the case where the aforesaid recesses 6 are provided, when there are water drops adhered on the outer surface 4a of the wind lip 4, the water drops will try to enter the inner surface side of the wind lip 4 mainly through the corner portion 6a of the recesses 6 due to the turbulence around the recesses 6. That will be not desirable because if the water drops enter the inner surface side of the wind lip 4, there is concern that the attention of riders might be drawn to the water drops.

To solve this problem, drain grooves 5A are provided on both sides of each corner portion 6a in the present invention. FIG. 4 shows such a configuration in which the drain groove 5A is respectively provided on both sides of each corner portion 6a. Since a pair of the drain grooves 5A are formed to sandwich the corner portion 6a, part of the water drops adhered around the corner portion 6a can be captured by the drain grooves 5A, and therefore the water drops can be prevented from gathering at the corner portion 6a. Thus, the drain grooves 5A are preferably formed very close to the corner portion 6a. For example, each of the drain grooves 5 is formed at a position 10 mm or less (preferably 5 mm or less) from the corner portion 6a (from an imaginary corner point in the case of the present embodiment in which the corner portion 6a is formed by several curved portions).

Figure 5:
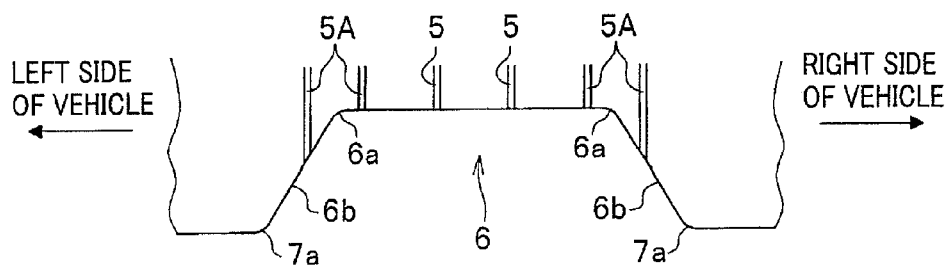
FIG. 5 is a view explaining the positions where a plurality of drain grooves are formed, in a modification of the present invention.

Incidentally, FIG. 4 shows a case where the pair of drain grooves 5A sandwich not only the corner portion 6a but also a corner portion 7a of the projection 7. However, in the case where the side edge portion 6b of the recess 6 is remarkably inclined as shown in FIG. 5, the pair of drain grooves 5A can sandwich only the corner portion 6a of the recess 6.

The preferred embodiment is described as above. The extending direction of the each of the drain grooves 5 does not have to be perpendicular to the vehicle width direction but can be other as long as the extending direction of the each of the drain grooves 5 has an angle of intersection with respect to the vehicle width direction. Further, it is to be understood that the present invention is not limited to the embodiment described above, and various variations in design can be made without departing from the spirit and scope of the present invention.

What is claimed is:

1. A drain structure of a roof panel, comprising:
a roof panel attached to a roof of a vehicle so that the roof panel can be tilted up; and
a wind lip provided in a peripheral edge portion of a lower surface of the roof panel, the wind lip projecting toward an inside of the vehicle,
wherein a drain groove extending in up-and-down direction is formed on an outer surface of the wind lip, and recesses and projections are alternatively formed on a lower end of the wind lip along a vehicle width direction, and at least the recesses are respectively provided with the drain groove.

2. The drain structure of the roof panel according to claim 1, wherein at least a pair of the drain grooves are formed to sandwich a corner portion of the recess.

3. The drain structure of the roof panel according to claim 2, wherein at least a pair of the drain grooves are formed to sandwich corner portions of the recess and the projection.

4. The drain structure of the roof panel according to claim 1, wherein the drain groove is formed on a seal member fixing frame attached to an edge portion of the roof panel.

5. The drain structure of the roof panel according to claim 1, wherein the projecting portions are free of the drain grooves.

* * * * *